United States Patent [19]
Asanuma et al.

[11] Patent Number: 5,232,992
[45] Date of Patent: Aug. 3, 1993

[54] MOLDED ARTICLES OF SYNDIOTACTIC POLYPROPYLENE AND METHOD FOR PREPARING SAME

[75] Inventors: Tadashi Asanuma, Takaishi; Tetsunosuke Shiomura, Tokyo; Nobutaka Uchikawa; Tateyo Sasaki, both of Takaishi; Takeo Inoue, Kawachinagano, all of Japan

[73] Assignee: Mitsui Toatsu Chemicals, Incorporated, Tokyo, Japan

[21] Appl. No.: 593,734

[22] Filed: Oct. 5, 1990

[30] Foreign Application Priority Data

| Apr. 11, 1989 | [JP] | Japan | 1-89719 |
| Apr. 18, 1989 | [JP] | Japan | 1-96346 |
| Apr. 2, 1990 | [JP] | Japan | 2-84843 |

[51] Int. Cl.$^5$ ............................................. C08L 23/00
[52] U.S. Cl. .................................. 525/240; 525/243; 525/245; 525/191
[58] Field of Search ................ 525/240, 191, 243, 245

[56] References Cited

U.S. PATENT DOCUMENTS 3,367,926  2/1968  Voeks.
4,500,681  2/1985  Shulman ............................. 525/222

FOREIGN PATENT DOCUMENTS 0428972  5/1991  European Pat. Off.

OTHER PUBLICATIONS

World Patent Index Latest; Week 8814; AN 83-779353[40] & JP-A-58 142 818 (Idemitsu Pertrochem) Aug. 25, 1983 (Abstract).
World Patent Index Latest; Week 9101; AN 86-261852[40] & JP-A-61 189 920 (Idemitsu Pertrochem, KK) Aug. 23, 1986 (Abstract).

Primary Examiner—John Kight, III
Assistant Examiner—Duc Truong
Attorney, Agent, or Firm—Burns, Doane, Swecker & Mathis

[57] ABSTRACT

According to the present invention, molded articles can be provided in which a melting point attributed to a syndiotactic polypropylene and measured at a temperature rise rate of 10° C./minute by differential scanning thermal analysis is indicated by a substantially single peak, the aforesaid molded articles being obtained by heating, melting and molding a substantially syndiotactic homopolymer of propylene, a substantially syndiotactic copolymer of propylene and a small amount of another olefin, or a mixture of these polymers and a small amount of a substantially isotactic polypropylene, and then subjecting the molded products to a heat treatment. Furthermore, a method for preparing the above-mentioned molded articles is also provided. The molded articles have high stiffness and impact resistance.

23 Claims, No Drawings

MOLDED ARTICLES OF SYNDIOTACTIC POLYPROPYLENE AND METHOD FOR PREPARING SAME

This application is a Continuation-In-Part of International Application PCT/JP90/00482 filed Apr. 10, 1990, which designated the United States.

TECHNICAL FIELD

The present invention relates to molded articles of a syndiotactic polypropylene. More specifically, the present invention relates to molded articles having excellent characteristics balanced between stiffness and impact resistance which can be obtained by molding a syndiotactic polypropylene homopolymer having relatively high tacticity, a copolymer of propylene and a small amount of another olefin, or a mixture of these polymers and isotactic polypropylene, and a method for preparing the same.

BACKGROUND TECHNOLOGY

A syndiotactic polypropylene has been known for a long period of time. Such a conventional polypropylene can be prepared by a low-temperature polymerization in the presence of a catalyst comprising a vanadium compound, an ether and an organic aluminum compound, but it is believed that this kind of polymer is poor in syndiotacticity and has elastomer-like properties. However, these elastomer-like properties are different from inherent characteristics of the syndiotactic polypropylene. In recent years, a polypropylene having good tacticity, i.e., a syndiotactic pentad fraction of more than 0.7 has been discovered for the first time by J. A. Ewen et al. which can be obtained by the use of a catalyst comprising a transition metal compound having an asymmetric ligand and aluminoxane (J. Am. Chem. Soc., 110, p. 6255–6256, 1988).

According to the research of the present inventors, it has been perceived that molded articles obtained by molding a syndiotactic polypropylene prepared through the above-mentioned process, a substantially syndiotactic copolymer of propylene and another olefin, or a mixture of these polymers and a small amount of a substantially isotactic polypropylene in a usual molding manner are relatively excellent in impact resistance but are not satisfactory in point of stiffness.

DISCLOSURE OF THE INVENTION

An object of the present invention is to provide molded articles retaining excellent impact resistance and having improved stiffness, and a method for preparing the same.

The above-mentioned one object of the present invention can be achieved by providing molded articles in which a melting point attributed to a syndiotactic polypropylene and measured at a temperature rise rate of 10° C./minute by differential scanning thermal analysis is indicated by a substantially single peak, the aforesaid molded articles being obtained by heating, melting and molding a substantially syndiotactic homopolymer of propylene, a substantially syndiotactic copolymer of propylene and a small amount of another olefin, or a mixture of these polymers and a small amount of a substantially isotactic polypropylene, and then subjecting the molded products to a heat treatment.

The other object of the present invention can be accomplished by providing a method for preparing molded articles of a syndiotactic polypropylene which comprises heating, melting and molding a substantially syndiotactic homopolymer of propylene, a substantially syndiotactic copolymer of propylene and a small amount of another olefin, or a mixture of these polymers and a small amount of a substantially isotactic polypropylene, and then subjecting the molded products to a heat treatment.

The above-mentioned molded articles of the present invention have an extremely excellent transparency and balanced physical properties, which means that they are industrially very valuable.

BEST EMBODIMENT TO PRACTICE THE INVENTION

In the present invention, a catalyst is used to prepare a substantially syndiotactic homopolymer of propylene and a substantially syndiotactic copolymer of propylene and a small amount of another olefin, and examples of the catalyst include compounds enumerated in the above-mentioned literature. However, another catalyst can also be used, so long as it can provide a polypropylene having a syndiotactic pentad fraction of about 0.7 or more when propylene is subjected to homopolymerization.

In the present invention, the homopolymer of propylene having a substantially syndiotactic structure is a polypropylene having such a highly syndiotactic structure that the intensity of the peak of a methyl group attributed to the syndiotactic pentad structure which appears at about 20.2 ppm on the basis of tetramethylsilane when measured at 135° C. in trichlorobenzene by $^{13}$C-NMR is 0.5 or more, preferably 0.7 or more to the sum of the intensities of peaks of the total methyl groups, the aforesaid crystalline polypropylene being partially soluble in toluene at room temperature as much as 10% by weight or less. Furthermore, the copolymer contains 20% by weight or less of a monomer other than propylene and has such a highly syndiotactic structure that the intensity of a peak which appears at about 20.2 ppm when similarly measured by $^{13}$C-NMR is 0.3 or more, preferably 0.5 or more to the total intensities of a peak attributed to the methyl groups of propylene.

In the present invention, examples of a transition metal compound having an asymmetric ligand which is useful in preparing the above-mentioned polymer include isopropyl(cyclopentadienyl-1-fluorenyl)hafnium dichloride and isopropyl(cyclopentadienyl-1-fluorenyl)zirconium dichloride. Furthermore, examples of the aluminoxane include compounds represented by the general formula

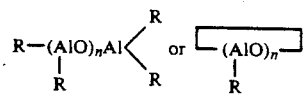

wherein R is a hydrocarbon residue having 1 to 3 carbon atoms. In particular, a methylaluminoxane is suitably used of which R is a methyl group and n is 5 or more, preferably from 10 to 100. The amount of the aluminoxane is 10 to 1000000 mole times, usually 50 to 5000 mole times as much as that of the transition metal compound.

No particular restriction is put on polymerization conditions for the manufacture of the copolymer of the present invention, and various polymerization techniques are utilizable such as solvent polymerization using an inert solvent, mass polymerization in which there is substantially no inert solvent, and gas phase polymerization. Usually, the polymerization temperature is from $-100°$ to $200°$ C. and the polymerization pressure is from atmospheric pressure to $-100$ kg/cm$^2$G, and preferably the temperature is from $-100°$ to $100°$ C. and the pressure is from atmospheric pressure to 50 kg/cm$^2$G.

Examples of the olefins other than propylene which can be used for the copolymerization with propylene are ethylene and $\alpha$-olefins having 4 to 20 carbon atoms, and typical examples thereof include straight-chain $\alpha$-olefins such as butene-1, pentene-1, hexene-1, heptene-1, octene-1, nonene-1, decene-1, undecene-1, dodecene-1, tridecene-1, tetradecene-1, pentadecene-1, hexadecene-1 and octadecene-1, and branched $\alpha$-olefins such as 3-methylbutene-1, 4-methylpentene-1 and 4,4-dimethylpentene-1.

The ratio of the other olefin to the copolymer is usually 20% by weight or less, preferably 15% by weight or less. When the ratio is more than 20% by weight, the stiffness of the molded articles undesirably deteriorates.

In the present invention, the homopolymerization or the copolymerization can be carried out usually by one-stage polymerization. The thus obtained polymer has a narrow molecular-weight distribution, and a ratio of weight-average molecular weight to number-average molecular weight (hereinafter referred to simply as "MW/MN") which are measured at 135° C. by gel permeation chromatography is usually from about 1.5 to about 3.5. However, when two kinds of transition metal compounds, for example, a zirconium compound and a hafnium compound are used, or when two or more kinds of polymers having different molecular weights are mixed, the polymer can be prepared which has a ratio in an extensive molecular weight distribution range of from about 3.5 to about 15. In the present invention, the polymer having any molecular weight distribution can be utilized.

With regard to the polymer which can be-used in the present invention, its intrinsic viscosity, when measured in a tetralin solution at 135° C., is from 0.1 to 10, preferably from 0.5 to 5.0.

In the present invention, a portion, e.g., less than 50% by weight, preferably 40% by weight or less of the syndiotactic polypropylene or the syndiotactic polypropylene copolymer can be replaced with an isotactic polypropylene, and in such a case, the molded articles having high stiffness can be obtained. In this process, various kinds of commercially available isotactic polypropylenes can be utilized. The isotactic polypropylene can be synthesized by a titanium trichloride or titanium tetrachloride carried on magnesium dichloride by which the polypropylene having so-called high steric regularity is provided. Preferable are the isotactic polypropylenes in which an isotactic pentad fraction, when measured by $^{13}$C-NMR, is 0.90 or more and in which intrinsic viscosity is from 0.1 to 10, preferably from about 0.5 to about 5. In this process, if the amount of the isotactic polypropylene is more than 50% by weight, impact resistance is poor.

The above-mentioned substantially syndiotactic homopolymer of propylene, the substantially syndiotactic copolymer of propylene and a small amount of other $\alpha$-olefin, or the mixture of these polymers and a small amount of the substantially isotactic polypropylene is then heated, melted and molded into a desired shape.

Any particular restriction is not put on a molding process, and, for example, an extrusion process and an injection molding process can be employed.

With regard to molding temperature conditions used in the above-mentioned usual molding process, for example, the maximum temperature in a melting zone in an extruding machine for the injection molding process is from 150° to 300° C., and the dice temperature in the extruding machine is from 150° to 250° C. In this connection, a period of time required to cool the molded articles to 50° C. is usually in a range of from 30 seconds to several minutes, and in the injection molding process, a cooling time necessary to cool the articles to 50° C. is usually in a range of from several seconds to several minutes.

What is important for the present invention is that a heat treatment is carried out after the polymer or the like has been molded. When this heat treatment is done, the molded articles can be obtained in which a melting point attributed to a syndiotactic polypropylene and measured at a temperature rise rate of 10° C./minute by differential scanning thermal analysis may be indicated by a substantially single peak. In consequence, the molded articles having excellent stiffness can be prepared.

The melting point of the molded article attributed to a syndiotactic polypropylene can be determined in a usual measurement manner, i.e., in accordance with differential scanning thermal analysis by first melting the polymer once at 250° C., lowering the temperature of the polymer to 30° C. at the rate of 10° C./minute in order to measure a crystallization temperature of the polymer, and then elevating the temperature of the polymer again at 10° C./minute to measure the melting point. Alternatively, the melting point may also be determined as follows: the polymer articles molded in the usual manner without any heat treatment are heated at the rate of 10° C./minute, ad at this time, two or three melting points are observed. Of these melting points, the highest temperature level is regarded as the melting point of the molded articles.

With regard to conditions for the heat treatment employed in the present invention, the heating temperature is in a range of from 50° C. to less than the melting point of the molded aricles, preferably from 80° C. to less than the melting point thereof. The heating time is in a range of from several seconds to several tens hours, depending upon the melting point of the polymers and the heating temperature. Needless to say, the higher the heating temperature is, the shorter the heating time is. For example, if a strict temperature control is possible, the heating time of from 1 minute to 5 hours is enough on condition that the heating temperature is 1-5° C. lower than the melting point of the articles. However, if the heating temperature is 70° C. or more lower than the melting point, for example, if it is 80° C. or less in the case of the propylene homopolymer, a long time of several tens hours is required. In particular, if it is 50° C. or less, characteristics of the articles cannot be improved, even when they are heated for a period of from several days to several months, which is not practical. Conversely, even if the articles are heated for an excessively long time, the characteristics cannot be bettered any more.

As understood from the foregoing, the reqired heating time should be a period of time enough to cause the melting point attributed to a syndiotactic polypropylene to be indicated by a single peak. In general, the heating time is from several seconds to 180 minutes, preferably from several tens seconds to 180 minutes, more preferably from several minutes to 180 minutes, at a temperature of 90° to 165° C., preferably 100° to 155° C.

In the heat treatment of the present invention, it is not always necessary to cool the molded articles to 50° C. or less, and the object of the present invention can also be achieved by effecting the heat treatment in the above-mentioned preferable temperature range.

In molding the above-mentioned polymer of the present invention, an antioxidant, an ultraviolet absorber, a nucleating agent and the like which can usually be used in the molding step of the polyolefin may be mixed therewith. In such a case, any nucleating agent can be used, so long as it can raise the crystallization temperature of the syndiotactic polypropylene, and usually, the usable nucleating agents are what have higher melting points than the syndiotactic polypropylene and lower contact energy with the syndiotactic polypropylene. In addition, nucleating agents for the isotactic polypropylene are also usable. Typical examples of the nucleating agents include salts of benzoic acid, benzylidene sorbitols, salts of phosphoric esters, polymers having high melting points such as polyvinylcyclohexane, poly-3-methylbutene, crystalline polystyrene and trimethylvinylsilane, and inorganic compounds such as talc, kaolin and mica. The amount of the nucleating agent is usually from 0.001 ppm to 1% by weight, depending upon the kind of nucleating agent itself.

Now, the present invention will be described in more detail in reference to examples.

EXAMPLE 1

In 1 liter of toluene in a 2-liter autoclave were dissolved 10 mg of isopropyl(cyclopentadienyl-1-fluorenyl)zirconium dichloride and 1.34 g of methylaluminoxane having a polymerization degree of about 15. Here, the aforesaid isopropyl(cyclopentadienyl-1-fluorenyl)zirconium dichloride was that which had been obtained by introducing lithium into isopropylcyclopentadienyl-1-fluorene synthesized in an ordinary manner and then reacting the same with zirconium tetrachloride, and the aforesaid methylaluminoxane was that which had been obtained by reacting copper sulfate hexahydrate with trimethylaluminum in toluene. Afterward, polymerization was carried out at 50° C. under a pressure of 2 kg/cm$^2$-G for 1 hour. After the polymerization, the unpolymerized propylene was purged, taken out slurry therefrom, filtered at 30° C., and then washed with 500 ml of toluene five times. The resulting powder was then dried at 80° C. under reduced pressure. The amount of the obtained powder was 28 g. According to $^{13}$C-NMR analysis, a syndiotactic pentad fraction was 0.902, an intrinsic viscosity $\eta$ measured in a tetralin solution at 135° C. was 0.88, and MW/MN was 2.2. The powdery product was named polymer A.

This powder was then press-molded at 250° C. in order to form a sheet having a thickness of 1 mm, and the sheet was cooled to 20° C. in 5 minutes. Afterward, the sheet was heated up to 140° C. and then maintained at this temperature level for 15 minutes, and it was then cooled to 30° C. in 5 minutes. Next, the following physical properties were measured.

| | |
|---|---|
| Flexural stiffness (kg/cm$^2$) | ASTM D747 (23° C.) |
| Tensile yield strength (kg/cm$^2$) | ASTM D638 (23° C.) |
| Elongation (%) | ASTM D638 (23° C.) |
| Izod impact strength (notched) (kg · cm/cm) | ASTM D256 (23° C., −10° C.) |

The flexural stiffness was 5900 kg/cm$^2$, the tensile yield strength was 257 kg/cm$^2$, the elongation was 257%, and values of Izod impact strength were 14.1 and 2.3 (at 23° C. and −10° C., respectively) kg.cm/cm, and a melting point measured by a differential scanning calorimeter was 148° C. and the number of a peak was one.

COMPARATIVE EXAMPLE 1

The same procedure as in Example 1 was effected except that the heat treatment was not carried out, and for the resulting sheet, physical properties were then measured. The results are set forth in Table 1. Melting points measured by a differential scanning calorimeter were 132° C. and 146° C. which were indicated by two peaks.

EXAMPLE 2

The same procedure as in Example 1 was effected except that the heat treatment was carried out at 125° C. for 1 hour, and for the resulting sheet, physical properties were measured. The results are set forth in Table 1. A melting point measured by a differential scanning calorimeter was 146° C. which was indicated by one peak.

EXAMPLE 3

In a 5-liter autoclave were placed 1500 g of propylene, and 10 mg of isopropyl(cyclopentadienyl-1-fluorenyl)zirconium dichloride and 1.34 g of methylaluminoxane having a polymerization degree of about 15 were then injected thereinto at 30° C. Afterward, the mixture was stirred at 30° C. for 1 hour, and the unpolymerized propylene was purged. The product was then dried at 80° C. under reduced pressure in order to obtain 68 g of a syndiotactic polypropylene. The latter was dispersed in 500 ml of hexane three times, filtered at 30° C., washed with 500 ml of hexane, and then dried at 80° C. under reduced pressure to obtain 49 g of a powder. This product was named polymer B.

According to $^{13}$C-NMR analysis of this powder, a syndiotactic pentad fraction was 0.914, and MW/MN was 2.1. This powder was then molded and heat treatment was carried out in the same manner as in Example 1, and physical properties were then measured. The results are set forth in Table 1.

The melting point of the product was 141.3° C., and the number of a peak was one.

COMPARATIVE EXAMPLE 2

The same procedure as in Example 3 was effected except that the heat treatment was not carried out, and for the resulting sheet, physical properties were then measured. The results are set forth in Table 1. The melting points of the sheet were 126° C. and 139° C. which were indicated by two peaks.

EXAMPLE 4

Talc was added to the powder obtained in Example 1 in a weight ratio of 1/1000 to the powder, and the mixture was then press-molded at 250° C. in order to form a sheet having a thickness of 1 mm. This sheet was cooled to 135° C. in 2 minutes and then subjected to a heat treatment at 135° C. for 2 hours. Afterward, the sheet was cooled to 30° C. in 10 minutes, and physical properties were then measured. The reuslts are set forth in Table 1.

A melting point measured by a differential scanning calorimeter was 152.1° C.

COMPARATIVE EXAMPLE 3

The same procedure as in Example 4 was effected except that the heat treatment was not carried out at 135° C. and the product was then cooled from 135° C. to 30° C. in 3 minutes, and for the resulting sheet, physical properties were then measured. The results are set forth in Table 1. Melting points measured by a differential scanning calorimeter were 139.4° C. and 146° C. which were indicated by two peaks.

EXAMPLE 5

The same procedure as in Example 4 was effected except that aluminum salt of benzoic acid was used as a nucleating agent and the temperature in a heat treatment 140° C., and for the resulting sheet, physical in Table 1. A melting point measured by a differential scanning calorimeter was 153.5° C. and the number of a peak was one.

EXAMPLE 6

The same molding and heat treatment as in Example 3 were effected except that the powder obtained in Example 3 was used and quinacridone was used as a nucleating agent in a weight ratio of 1/100000 to the powder, and physical properties were then measured. The results are set forth in Table 1.

A melting point measured by a differential scanning calorimeter was 154.5° C. and the number of a peak was one.

COMPARATIVE EXAMPLE 4

The same procedure as in Example 6 was effected except that the heat treatment was not carried out, and for the resulting sheet, physical properties were then measured. The results are set forth in Table 1.

The melting points of the product were 146.5° C. and 136.5° C. which were indicated by two peaks.

EXAMPLE 7

In a 200-liter autoclave, 0.1 g of isopropyl(cyclo-pentadienyl-1-fluorenyl)hafnium dichloride, 0.1 g of isopropyl(cyclopentadienyl-1-fluorenyl)zirconium dichloride and 30 g of methylaluminoxane (polymerization degree 16.1) made by Toso Akuzo Corp. were added to 80 liters of toluene. Here, the aforesaid isopropyl(cyclopentadienyl-1-fluorenyl)hafnium dichloride was that which had been obtained by introducing lithium into isopropylcyclopentadienyl-1-fluorene synthesized in an ordinary manner, reacting the same with hafnium tetrachloride (containing 5% by weight of zirconium), and then recrystallizing the resulting reaction product, and the aforesaid isopropyl(cyclopentadienyl-1-fluorenyl)-zirconium dichloride was that which had been synthesized in a similar manner. Afterward, polymerization was carried out at 20° C. under a pressure of 3 kg/cm$^2$-G for 2 hour, and ash was then removed from the resulting polymer by the use of methanol and methyl acetoacetate. Afterward, the polymer was washed with an aqueous hydrochloric acid solution, followed by filtering in order to obtain 4.6 kg of a syndiotactic polypropylene. The latter was named polymer C.

With regard to this polypropylene, the results of $^{13}$C-NMR analysis indicated that a syndiotactic pentad fraction was 0.904, an intrinsic viscosity measured in a tetralin solution at 135° C. was 1.68, and MW/MN measured in 1,2,4-trichlorobenzene was 5.2.

Then, a phenolic antioxidant was further added to this polypropylene at a concentration of 0.1% by weight, and grains were formed therefrom by means of an extruder. Afterward, they were melted and pressed at 200° C. to prepare a sheet having a thickness of 1 mm, and the latter was then cooled to 30° C. in 3 minutes. Next, this molded article was placed in an electric furnace having a controlled temperature of 130° C., and then subjected to a heat treatment for 30 minutes, followed by cooling to 30° C. in 3 minutes, whereby physical properties such as tensile yield strength and flexural stiffness of the article were improved, as shown in Table 1.

A melting point of the article measured by a differential scanning calorimeter was 148.5° C. and the number of a peak was one.

COMPARATIVE EXAMPLE 5

The same procedure as in Example 7 was effected except that the pressed sheet was not subjected to the heat treatment, and for the resulting article, physical properties were measured. The results are set forth in Table 1.

Melting points of the article were 123.5° C. and 148.5° C. and the number of peaks was two.

EXAMPLE 8

In polymerization, hexene-1 was used, so that a copolymer containing 6% by weight of hexene-1 was obtained. According to $^{13}$C-NMR analysis, a peak intensity at about 20.2 ppm is 0.68 to the total peak intensity of methyl groups of a propylene unit, which meant that the thus obtained copolymer had a substantially syndiotactic structure. Furthermore, the MW/MN of the copolymer was 4.55. This copolymer was named polymer D.

A sheet was formed from the copolymer in a similar manner, and it was then subjected to a heat treatment at 110° C. for 2 hours and then cooled to 30° C. in 10 seconds. Physical properties were then measured, and the results are set forth in Table 1.

A melting point of the article measured by a differential scanning calorimeter was 136.2° C. and the number of a peak was one.

COMPARATIVE EXAMPLE 6

The same procedure as in Example 8 was effected except that the pressed sheet was not subjected to the heat treatment, and for the resulting article, physical properties were measured. The results are set forth in Table 1.

Melting points of the article measured by a differential scanning calorimeter were 120.3° C. and 132.0° C. and the number of peaks was two.

EXAMPLE 9

The same procedure as in Example 1 was effected except that 10 parts by weight of a commercially available isotactic polypropylene (isotactic pentad fraction 0.962, and intrinsic viscosity η 1.62) was mixed with 90 parts by weight of a syndiotactic polypropylene obtained in Example 7. The MW/MN of the mixture was 7.5. This was named polymer E.

The thus obtained powder was molded and cooled in the same manner as in Example 7, and the molded sheet was then placed in an electric furnace having a controlled temperature of 145° C. and then thermally treated for 30 minutes and cooled to 30° C. in 3 minutes. In consequence, physical properties such as tensile yield strength and flexural stiffness of the molded article were improved, as shown in Table 1.

Melting points of the article measured by a differential scanning calorimeter were 152.3° C. and 162.4° C., and the number of a peak attributed to the syndiotactic polypropylene was one of 152.3° C. The other peak of 162.4° C. was indicative of the melting point of the isotactic polypropylene.

COMPARATIVE EXAMPLE 7

The same procedure as in Example 9 was effected except that the pressed sheet was not subjected to the heat treatment, and for the resulting article, physical properties were measured. The results are set forth in Table 1.

Melting points of the article measured by a differential scanning calorimeter were 128.2° C., 148.7° C. and 162.2° C. which were indicated by three peaks. The peaks attributed to the syndiotactic polypropylene were two of 128.2° C. and 148.7° C. The other peak of 162.2° C. was indicative of the melting point of the isotactic polypropylene.

What is claimed is:

1. A molded article of which a melting point attributed to a syndiotactic polypropylene and measured at a temperature rise rate of 10° C./minute by differential scanning thermal analysis is indicated by a substantially single peak; and being obtained by hating, melting and molding a substantially syndiotactic homopolymer of propylene a substantially syndiotactic copolymer of propylene and a small amount of another olefin, or a mixture of these polymers and a small amount of a substantially isotactic polypropylene, and then subjecting the molded products to a heat treatment at a temperature of from 50° C. to less than the melting point of said molded product and for a time sufficient to obtain said substantially single peak melting point; wherein the homopolymer and copolymer are a polypropylene or a propylene copolymer having a highly syndiotactic structure such that the intensity of the peak of a methyl group attributed to the syndiotactic pentad structure which appears at about 20.2 ppm on the basis of tetramethylsilane when measured at 135° C. in trichlorobenzene by $^{13}$C-NMR is 0.5 or more.

2. A molded article according to claim 1 which contains a nucleating agent for crystallization.

3. A method for preparing a molded article of a syndiotactic polypropylene which comprises heating, melting and molding a substantially syndiotactic homopolymer of propylene, a substantially syndiotactic copolymer of propylene and a small amount of another olefin or a mixture of these polymers and a small amount of a substantially isotactic polypropylene, and then subjecting the molded products to a heat treatment at a temper-

TABLE 1

| | Polymer | Nucleating Agent Weight Ratio | Nucleating Agent Kind | Heat Treatment Temp. (°C.) | Heat Treatment Time (min) | Flexural Stiffness (kg/cm$^2$) | Tensile Yield Strength (kg/cm$^2$) |
|---|---|---|---|---|---|---|---|
| Example 1 | A | — | | 140 | 15 | 5900 | 257 |
| Comp. Ex. 1 | A | — | | — | — | 4700 | 204 |
| Example 2 | A | — | | 125 | 60 | 5500 | 248 |
| Example 3 | B | — | | 140 | 15 | 5300 | 240 |
| Comp. Ex. 2 | B | — | | — | — | 4900 | 223 |
| Example 4 | A | 1/1000 | Talc | 135 | 120 | 6800 | 265 |
| Comp. Ex. 3 | A | 1/1000 | Talc | — | — | 6100 | 255 |
| Example 5 | A | 1/1000 | Al salt of benzoic acid | 140 | 120 | 6900 | 268 |
| Example 6 | B | 1/100000 | quinacridone | 140 | 15 | 6400 | 274 |
| Comp. Ex. 4 | B | 1/100000 | quinacridone | — | — | 6000 | 258 |
| Example 7 | C | — | | 130 | 30 | 5800 | 255 |
| Comp. Ex. 5 | C | — | | — | — | 5250 | 210 |
| Example 8 | D | — | | 110 | 120 | 5150 | 230 |
| Comp. Ex. 6 | D | — | | — | — | 5100 | 210 |
| Example 9 | E | — | | 145 | 30 | 7900 | 295 |
| Comp. Ex. 7 | E | — | | — | — | 7300 | 268 |

| | Elongation (°C.) | Izod Impact Strength (kg·cm/cm) (23° C.) | Izod Impact Strength (kg·cm/cm) (−10° C.) | Melting Point (°C.) | Number of Peak |
|---|---|---|---|---|---|
| Example 1 | 257 | 14.1 | 2.3 | 148 | 1 |
| Comp. Ex. 1 | 740 | 14.1 | 2.1 | 122, 146 | 2 |
| Example 2 | 450 | 14.2 | 2.7 | 146 | 1 |
| Example 3 | 620 | 18.5 | 3.1 | 141.3 | 1 |
| Comp. Ex. 2 | 785 | 18.5 | 2.7 | 126, 139 | 2 |
| Example 4 | 380 | 14.5 | 2.5 | 152.1 | 1 |
| Comp. Ex. 3 | 517 | 14.2 | 2.3 | 139,4, 146 | 2 |
| Example 5 | 380 | 14.4 | 2.4 | 153.5 | 1 |
| Example 6 | 420 | 38.2 | 3.7 | 154.5 | 1 |
| Comp. Ex. 4 | 540 | 38.0 | 3.6 | 146.5, 136.5 | 2 |
| Example 7 | 430 | 28.0 | 3.6 | 148.5 | 1 |
| Comp. Ex. 5 | 420 | 12.7 | 3.6 | 123.5, 148.5 | 2 |
| Example 8 | 510 | 38.0 | 3.3 | 136.2 | 1 |
| Comp. Ex. 6 | 460 | 18.5 | 3.7 | 120.3, 132.0 | 2 |
| Example 9 | 450 | 15.4 | 3.1 | 152.3 | 1 |
| Comp. Ex. 7 | 640 | 13.3 | 2.8 | 128.2, 148.7 | 2 | ing the molded products to a heat treatment at a temperature of from 50° C. to less than the melting point of said molded product and for a time sufficient to obtain said substantially single peak melting point; wherein the homopolymer and copolymer are a polypropylene or a propylene copolymer having a highly syndiotactic structure such that the intensity of the peak of a methyl group attributed to the syndiotactic pentad structure which appears at about 20.2 ppm on the basis of tetramethylsilane when measured at 135° C. in trichlorobenzene by $^{13}$C-NMR is 0.5 or more.

4. A method for preparing molded articles of a syndiotactic polypropylene according to claim 3 wherein said heat treatment is carried out so that said melting point attributed to said syndiotactic polypropylene and measured at a temperature rise rate of 10° C./minute by differential scanning thermal analysis may be indicated by a substantially single peak.

5. A method for preparing molded articles of a syndiotactic polypropylene according to claim 3 wherein said heat treatment is carried out at a 1-5° C. lower temperature than said melting point of said molded articles for a period of from 1 minute to 5 hours.

6. A method for preparing molded articles of a syndiotactic polypropylene according to claim 5 wherein after said heating, melting and molding, said molded products are cooled to 80° C. or less and then subjected to said heat treatment at a temperature of 90° to 165° C. for a period of several seconds to 180 minutes.

7. A method for preparing molded articles of a syndiotactic polypropylene according to claim 6 wherein after said heating, melting and molding, said molded products are cooled to 80° C. or less and then subjected to said heat treatment at a temperature of 100° to 165° C. for a period of several tens of seconds to 180 minutes.

8. A method for preparing molded articles of a syndiotactic polypropylene according to claim 3 wherein after said heating, melting and molding, said molded products are cooled to 80° C. or less or not cooled and then subjected to said heat treatment at a temperature of 100° to 155° C. for a period of several minutes to 180 minutes.

9. A method for preparing molded articles of a syndiotactic polypropylene according to claim 3 wherein said other olefin is one or more selected rom the group consisting of straight-chain α-olefins such as butene-1, pentene-1, hexene-1, heptene-1, octene-1, nonene-1, decene-1, undecene-1, dodecene-1, tridecene-1, tetradecene-1, pentadecene-1, hexadecene-1, and octadecene-1, and branched α-olefins such as 3-methylbutene-1,4-methylpentene-1 and 4,4-dimethylpentene-1 which have 4 to 20 carbon atoms.

10. A method for preparing molded articles of a syndiotactic polypropylene according to claim 3 wherein said homopolymer or copolymer is what is obtained by one-stage polymerization, and in said homopolymer or copolymer, a ratio of weight-average molecular weight to number-average molecular weight measured at 135° C. by gel permeation chromatography is in a range of from about 1.5 to about 3.5.

11. A method for preparing molded articles of a syndiotactic polypropylene according to claim 3 wherein said homopolymer or copolymer is what is obtained by polymerization using two or more kinds of transition metal compounds or what is obtained by mixing two or more polymers which are different in average molecular weight, and in said homopolymer or copolymer, a ratio of weight-average molecular weight to number-average molecular weight measured at 135° C. by gel permeation chromatography is in a range of from about 3.5 to about 15.

12. A method for preparing molded articles of a syndiotactic polypropylene according to claim 3 wherein in said copolymer, a ratio of said other olefin to propylene is 25% by weight or less.

13. A method for preparing molded articles of a syndiotactic polypropylene according to claim 3 wherein the molecular weight of said polymer is in a range of from 0.1 to 10 in terms of an intrinsic viscosity measured in a tetralin solution at 135° C.

14. A method for preparing molded articles of a syndiotactic polypropylene according to claim 3 wherein the content of said isotactic polypropylene is 40% by weight or less.

15. A method for preparing molded articles of a syndiotactic polypropylene according to claim 3 wherein said mixture additionally contains a nucleating agent for crystallization.

16. A method for preparing molded articles of a syndiotactic polypropylene according to claim 14 wherein the amount of said nucleating agent is in a range of from 0.001 ppm to 1% by weight to the total amount of said mixture.

17. A method for preparing molded articles of a syndiotactic polypropylene according to claim 14 wherein said nucleating agent is one or more selected from the group consisting of talc, aluminum salts of benzoic acid and quinacridone.

18. A molded articles according to claim 1, wherein said peak is 0.7 or more.

19. A method for preparing molded articles of a syndiotactic polypropylene according to claim 3, wherein said peak is 0.7 or more.

20. A method for preparing molded articles of syndiotactic polypropylene according to claim 1 wherein said heat treatment temperature is from 80° C. to less than the melting point of said molded product.

21. A method for preparing molded articles of syndiotactic polypropylene according to claim 3 wherein said heat treatment temperature is from 80° C. to less than the melting point of said molded product.

22. A molded articles according to claim 1 wherein said heat treatment temperature is from 90° to 165° C. for a period of several seconds to 180 minutes.

23. A molded article according to claim 1 wherein said heat treatment temperature is from 100° to 155° C. for a period of several tens of seconds to 180 minutes.

* * * * *

UNITED STATES PATENT AND TRADEMARK OFFICE
CERTIFICATE OF CORRECTION

PATENT NO.   : 5,232,992

DATED        : August 3, 1993

INVENTOR(S)  : Asanuma et al

It is certified that error appears in the above-identified patent and that said Letters Patent is hereby corrected as shown below:

Claim 1, line 5, column 10, "hating" should be --heating--;

line 7, column 10, add a comma after "propylene".

Claim 3, line 24, column 10, "a molded article" should be --molded articles--.

Claim 9, line 46, column 11, "rom" should be --from--.

Claim 18, line 41, column 12, "articles" should be --article--.

Claim 22, line 54, column 12, "articles" should be --article--.

Signed and Sealed this

Twenty-first Day of June, 1994

*Attest:*

BRUCE LEHMAN

*Attesting Officer*     *Commissioner of Patents and Trademarks*